United States Patent [19]

Tamama et al.

[11] 4,436,313
[45] Mar. 13, 1984

[54] DEVICE FOR SEALING A PROPELLER SHAFT AGAINST INVASION OF SEA WATER

[75] Inventors: Hiroshi Tamama; Yukio Ozawa, both of Saitama; Jingo Miyazaki, Tokyo; Hiroshi Ito, Saitama; Toyohiro Kinoshita, Tokyo, all of Japan

[73] Assignee: Japanese National Railways, Tokyo, Japan

[21] Appl. No.: 373,803

[22] Filed: Apr. 30, 1982

[51] Int. Cl.³ .................... F16J 15/54; F16J 15/40
[52] U.S. Cl. .................................... 277/80; 277/135; 277/DIG. 8
[58] Field of Search ............. 277/80, 1, 135, DIG. 7, 277/DIG. 8

[56] References Cited

U.S. PATENT DOCUMENTS

| | | | |
|---|---|---|---|
| 3,388,913 | 6/1968 | Tracy | 277/89 X |
| 3,545,770 | 12/1970 | Wheelock | 277/152 |
| 3,612,549 | 10/1971 | Berkowitz | 277/80 |
| 3,620,584 | 11/1971 | Rosenzweig | 277/80 X |
| 4,252,353 | 2/1981 | Raj et al. | 277/80 |

FOREIGN PATENT DOCUMENTS

| | | | |
|---|---|---|---|
| 1119965 | 4/1956 | France | 277/80 |
| 54-30347 | 3/1979 | Japan | 277/80 |
| 783881 | 10/1957 | United Kingdom | 277/80 |
| 781469 | 11/1980 | U.S.S.R. | 277/80 |
| 806964 | 2/1981 | U.S.S.R. | 277/80 |
| 804971 | 2/1981 | U.S.S.R. | 277/80 |

*Primary Examiner*—Robert S. Ward
*Attorney, Agent, or Firm*—Wenderoth, Lind & Ponack

[57] ABSTRACT

A sealing device for a ship's propeller shaft installed around the propeller shaft in which longitudinally spaced annular iron pole blocks, and circularly spaced permanent magnets fixed between the blocks are mounted in a cylindrical housing surrounding the propeller shaft, and a magnetic fluid fills gaps between the magnets and the annular iron pole blocks and either a liner mounted about the shaft or the shaft itself. The magnetic fluid serves as a sealant and completes a magnetic circuit which maintains a well defined thickness of magnetic fluid sealant and a high pressure seal even under great mechanical stress, thereby minimizing frictional power loss and wear to the propeller shaft or sleeves which are conventionally shrink-fitted thereto.

9 Claims, 10 Drawing Figures

DEVICE FOR SEALING A PROPELLER SHAFT AGAINST INVASION OF SEA WATER

BACKGROUND OF THE INVENTION AND PRIOR ART

The present invention relates to a frictionless, high-pressure sealing device for sealing a ship's body adjoining the stern tube holding the propeller shaft against invasion of sea water along the propeller shaft.

The conventional means to seal a ship's body adjoining the stern tube of the propeller shaft against invasion of sea water through the propeller shaft are the gland seal, the face type seal and the oil seal.

The gland seal includes packing provided with the propeller housing that externally seals the propeller shaft against sea water. This device is satisfactory in sealing performance but it has the unavoidable drawbacks that some of the power to drive the propeller shaft is lost due to friction caused by tight packing of the propeller shaft, and the shaft sleeve suffers wear from abrasion.

The face type seal includes a seal ring fitted to the periphery of the propeller shaft by means of a garter spring. The end face of the seal ring is circumferentially caused to slide against the inner wall of the housing, thereby yielding a sealing effect. This device has the following disadvantages: Since the seal-ring is positioned by means of a garter spring, it is difficult to secure a high-pressure seal; the seal is rendered useless if an eccentricity develops in the propeller shaft, power is unavoidably lost due to the friction between the seal-ring and the housing, which also suffers wear from an abrasion of the wall of the housing.

The oil seal is a device developed to eliminate the power loss due to friction, which is a common defect to the above-mentioned two devices. This device is designed so that a gap left between the inner wall of the housing and the propeller shaft is supplied with oil which forms a continuous film, thereby yielding a sealing effect. The most serious problems with this device are that, with no external means available to control the oil, oil consumption is heavy and a high-pressure seal is difficult to attain.

OBJECTS AND BRIEF SUMMARY OF THE INVENTION

A first object of the present invention is to provide a satisfactory sealing device which is frictionless and accordingly free from abrasion of the seal and a loss in the power to drive the propeller shaft.

A second object of the present invention is to provide a high-pressure, abrasion-less sealing device which is free from a loss in the power to drive the propeller shaft.

The objects are met by a sealing device which includes a cylindrical housing concentrically installed around the propeller shaft and annular iron pole blocks installed on a concentric circle of the housing such that the outside of the iron pole blocks are fixed, preferably with identical spacing in a longitudinal direction, on the inside of the housing. Permanent magnets of identical cross-section are mounted between the opposed ends of said annular iron pole blocks preferably with circumferentially identical spacing along part of a circle concentric to the housing. Relevant dimensions are selected so that when the propeller shaft is loosely fitted in the housing, the gap between the outside of propeller shaft and inside of the iron pole blocks will be smaller than the gap between the outside of the shaft and the inside of the permanent magnets and the clearance between them is filled with a magnetic fluid as the sealant.

In accordance with the second object, the bearing of the propeller shaft is equipped with a sleeve made of a non-magnetic material and a liner is fitted to the clamp ring of the propeller shaft so that a specific clearance can be maintained between the outside of the liner and the inside of the iron pole blocks and permanent magnets. The clearance formed between the inside of the permanent magnet and the iron pole block and the outside of said liner is filled with a magnetic fluid, the fluid serving as the sealant.

BRIEF DESCRIPTION OF THE DRAWINGS

Other objects, features and advantages of the present invention will become more apparent from the following detailed description made in conjunction with the attached drawings in which.

DETAILED DESCRIPTION OF THE INVENTION

Figure 1:
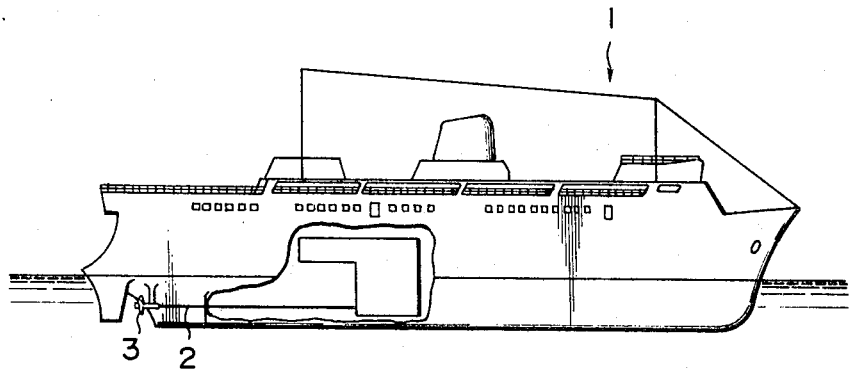
FIG. 1 is an elevational view of a ship fitted with a propeller shaft.
Figure 3:
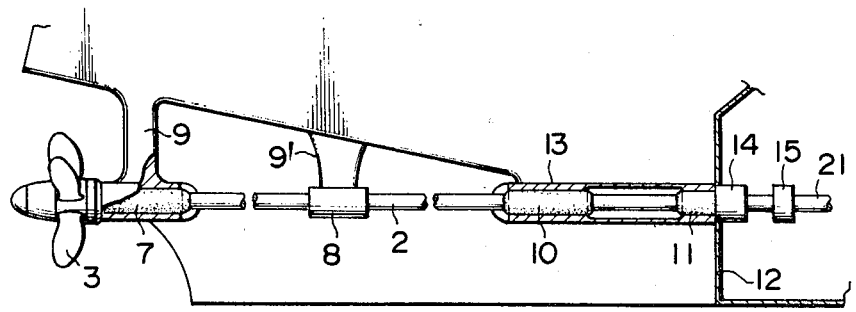
FIG. 3 is an enlargement of the propeller shaft illustrated in FIG. 1.
Figure 2:
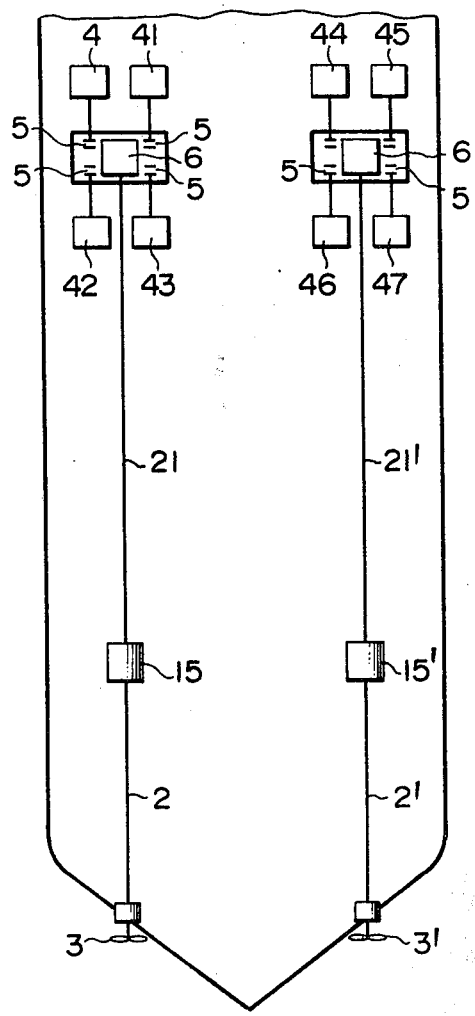
FIG. 2 is a bottom view schematically showing the drive mechanism of a propeller shaft.

First referring to FIGS. 1-3, the mechanism and installed position of the propeller shaft in a ship and the drive mechanism of it are to be simply described to the extent necessary for an understanding of the present invention. Referring to FIG. 1 and FIG. 2, at the stern bottom of the ship 1 propeller shafts 2 and 2' are installed symmetrically with respect to the longitudinal axis of the ship. At the stern ends of the propeller shafts 2 and 2' are respectively fitted the well-known variable-pitch propellers 3 and 3'. Depending on the power to be developed by the propeller shaft 2, propeller shaft 2 is driven by one or more of engines, 4, 41, 42 and 43. The output from these engines applies a specified torque to shaft 2 via the fluid coupling 5 and the change gearing 6. The rotation of the variable-pitch propeller 3 thus driven propels the ship. The propelling force will be greater when the propeller 3 is inclined to the surface of the sea-water than when it is perpendicular to that surface. Thus the number of engines to be driven depend on the power, which in turn depends on the inclination of the propeller 3. The propeller shaft 2' is of the same composition as the propeller shaft 2. Moreover, engines 44–47 are identical to engines 4, 41, 42 and 43, respectively, and the other elements identified with primed (') numerals in FIG. 2 are identical to the elements identified with unprimed numerals in FIG. 2.

FIG. 3 illustrates the details of propeller shaft 2. The intermediate shaft 21, one end of which is coupled to the drive engines 4, 41, 42 and 43 as illustrated in FIG. 2, is coupled via assembling flange 15 to propeller shaft 2. The propeller shaft 2 is supported by a specific part of the ship's body through the shaft bracket 9 and if necessary, through the intermediate shaft bracket 9' and the stern tube 13 as well. Sleeves 7, 8, 10 of brass castings are often shrink-fitted onto shaft 2 for the purpose of protecting the outside of that part of shaft 2 which is supported by the shaft brackets 9 and 9' and the stern tube 13. Under such an arrangement the propeller shaft 2 is immersed in sea water on the variable-pitch propeller 3 side of the water-tight partition 12, and is located within the body on the opposite side of partition 12. Therefore, the conventional practice of sealing against invasion of sea water through the propeller shaft is to seal the propeller shaft external at the position toward the ship's body from the side of the water-tight partition 12 in the stern tube 13. More specifically, the seal is provided at the inner position 14 of the ship's body at the stern tube end of the sleeve 11. Typical types of seals provided here include the gland seal and the face type seal.

Figure 4:
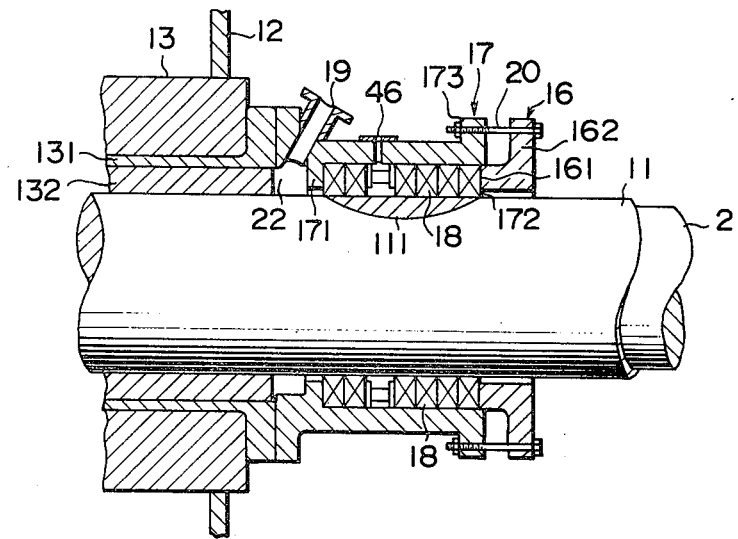
FIG. 4 is a sectional view illustrating a conventional gland seal for sealing a ship's body adjoining the stern tube of a propeller shaft against invasion of sea water through the propeller shaft.

FIG. 4 illustrates the gland seal with like numerals indicating like objects in FIGS. 1–3. Stern tube 13 holds the propeller shaft 2 through a bearing bushing 131 inside of which is a lignumvitae material 132 which permits the propeller shaft 2 to smoothly rotate. Clamp ring 16 having a flange 162 and an end face 161 has a thickness permitting it to go into opening 172 between the internal surface of cylindrical housing 17 and the external surface of sleeve 11. The aft end of housing 17 terminates in an inwardly extending projection 171 and the forward end of housing 17 has an outwardly extending flange 173 above opening 172.

In order to produce the gland seal, packing 18, principally composed of hemp or cotton and impregnated with an oil, is inserted between the housing 17 and the outside of the sleeve 11; thereafter the end face of the clamp ring 16 is pressed against the packing 18 at the opening 172 of the housing 17; and then the flange 162 of the clamp ring 16 and the opposed flange 173 of the housing 17 are fastened together by means of a bolt 20. In this way the packing 18 can be squeezed between the inside (forward side) of the projection 171 and the end face 161 of the clamp ring 16. The force pushing the packing 18 toward the outside of the sleeve 11 thus acts to protect the packing 18 from invasion of sea water into the ship's body through the outside of the propeller shaft 2.

An oil hole 46 is provided in housing 17 to feed the oil to the packing 18. A clean water tube 19 provides relatively clean water to a chamber 22 formed between projection 171 and bushing 131. The clean water is drawn into the ship's body from areas other than the sea around the propeller 3 (the sea water in the vicinity of a driven propeller is usually dirty on account of agitation by the propeller). The clean water stored in the chamber 22 at a specific pressure serves to insulate the lignumvitae material 132 from deterioration through contamination by the dirty water.

In this method it is possible to press the packing 18 with ample force toward the outside of the sleeve 11 and accordingly a satisfactory sealing effect is secured, but the friction of the packing 18 against the sleeve 11 of the propeller shaft 2 due to tightening of the packing 18 is heavy, and thus loss in power to drive the shaft is unavoidable. As a result, the part of the sleeve 11 which slides against the packing 18 is liable to get worn to a profile indicated by the curved line 111 in a relatively short period.

When the wear reaches a critical amount, said sleeve 11 must be replaced. Sleeve 11 is typically a brass casting cylinder externally shrink-fitted to the propeller shaft; and as described above, a single propeller shaft is equipped with a plurality of such sleeves. Thus, dismantling worn sleeves from the shaft and shrink-fitting new sleeves is impractical and it becomes inevitable to discard entire shafts as a whole at tremendous annual replacement costs.

Figure 5:
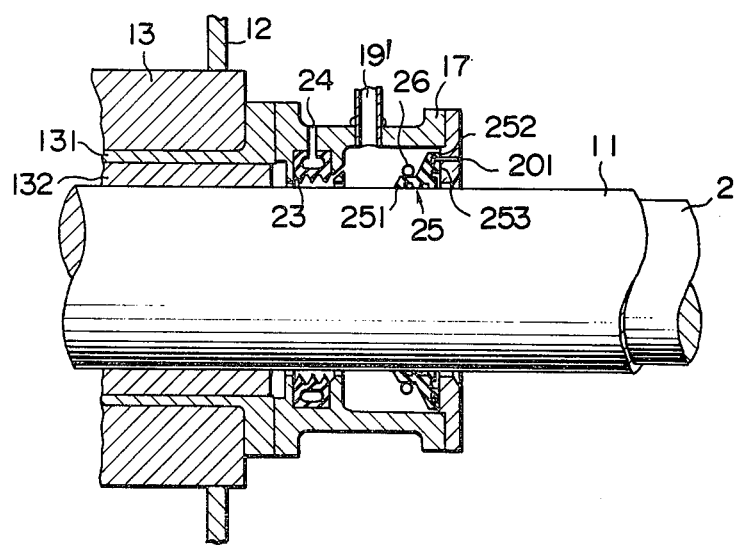
FIG. 5 is a sectional view illustrating a conventional face-type seal for sealing a ship's body adjoining the stern tube of a propeller shaft against the invasion of sea water through the propeller shaft.

FIG. 5 illustrates the face type seal. In FIG. 5 reference numbers 2, 11, 12, 13, 131 and 132 represent like elements in FIG. 4.

Within the housing 17 is held a seal-ring 25 of neoprene or like material. The seal-ring 25 consists of a base 251 and an upper inclined projection 252, formed as an integral unit. The base 251 is fixed to the specified part of the outside of the sleeve 11 by means of a garter spring 26. In the upper part of the outside inclined projection 252 is formed a depression 253, whose top and bottom edges slide against the opposed inside surface of the housing 17.

A clean water hole is provided thorough the forward end face of the housing 17. Clean water introduced into said depression 253 through said hole 201 removes the heat generated as the result of the seal-ring 25 sliding against the housing wall. Tube 19' is also a clean water hole which serves the same purpose as tube 19 shown in FIG. 4 and in addtion removes the heat generated by the sliding of the seal ring 25. An emergency inflatable ring 23, composed of an elastic material such as rubber may in case of an emergency be injected with pressurized air through a high-pressure hole 24, thereby fully inflating ring 23 and giving a temporary seal against sea water.

As mentioned above, there are several problems with the face type seal. Since the seal-ring 25 fixed to the outside of the sleeve 11 by means of the garter spring 26 is made to slide against the wall of the housing 17, a high-pressure seal is difficult to attain. Also, when the propeller shaft 2 becomes eccentric, sealing is rendered ineffective. As with the gland seal illustrated in FIG. 4, a power loss due to friction and a peripheral abrasion of the housing is unavoidable.

The problems inherent to the above-mentioned sealing devices in the prior art can be effectively resolved by the present invention.

Figure 6:
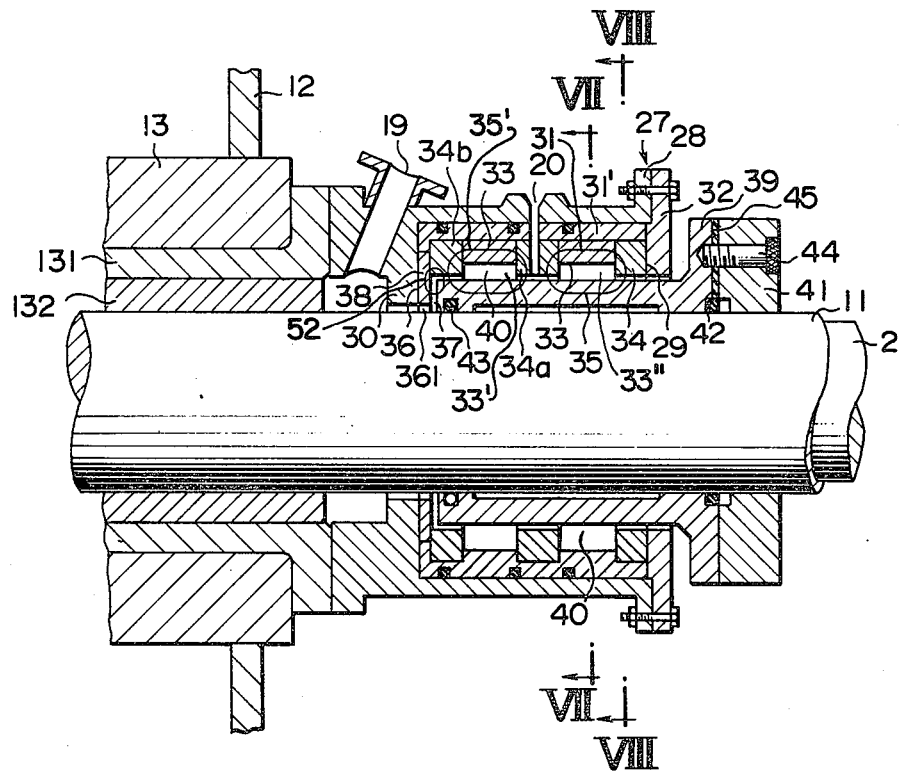
FIG. 6 is a longitudinal sectional view illustrating an embodiment of the present invention.
Figure 7:
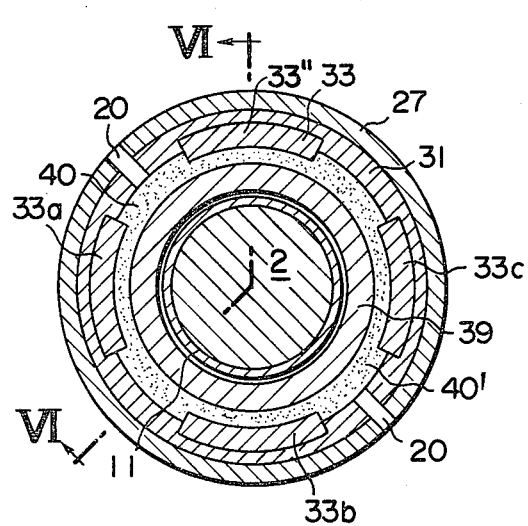
FIG. 7 is a sectional view through section line VII—VII of FIG. 6.
Figure 8:
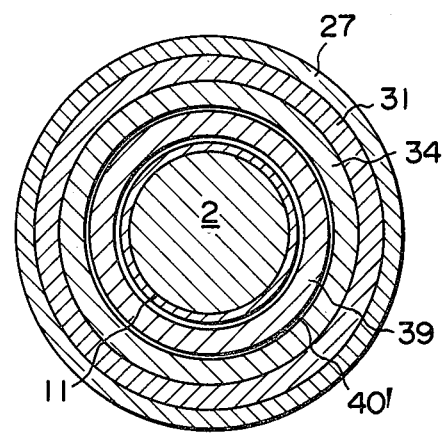
FIG. 8 is a sectional view through section line VIII—VIII of FIG. 6.

Referring to FIGS. 6–10, an embodiment of the present invention is to be described in detail. In FIG. 6, numerals 2, 11, 12, 13, 131, 132 and 19 represent like elements in FIG. 4. Cylindrical casing 27 is connected to the forward end of stern tube 13. The end portion 30 of casing 27 toward the stern tube 13 (aft end) extends to a specified distance in the axial direction of the shaft 2. The lower face of end portion 30 is separated by a specified gap from the opposed outside of the sleeve 11. The opposite (forward) end of casing 27 has a flange 28 surrounding an opening 29 to the interior of the casing 27.

A cylindrical housing 31 made of non-magnetic material has a cylindrical portion 31' inside casing 27 and has a front portion 32 which abuts the right (forward facing) wall of flange 28 and the inner wall of casing 27 adjoining thereto.

Cylindrical housing 31 is concentrically installed around the propeller shaft 2 and sleeve 11; annular iron pole blocks 34, 34a and 34b are installed on circles concentric with the cylindrical surfaces of the housing 31 such that the outsides of the iron pole blocks 34, 34a and 34b are fixed to the inside surface of housing 31, preferably with identical spacing at, say, three areas, that is, at both ends and at an intermediate area in a longitudinal direction on the inside of housing 31. Permanent magnets 33, 33a, 33b and 33c of identical arched cross-section are mounted, preferably with circumferentially identical spacing, against the inside surface of housing 31 in circles concentric to housing 31 between the opposing faces of annular iron pole blocks 34 and 34a and between the opposing faces of blocks 34a and 34b. The outside of permanent magnets 33, 33a, 33b and 33c partially recess into the inner wall of housing 31 located between the opposing faces of annular iron pole blocks 34 and 34a and between the opposing faces of block 34a and 34b.

In the illustrated embodiment, permanent magnets 33a, 33b and 33c partially recess into the inner wall of the housing 31, but this biting arrangement is not an essential feature. These magnets may be arranged in close contact with the wall of the housing 31. The key point in the present invention is that, as will be described in more detail below, a closed magnetic circuit is created by the permanent magnets, the iron pole blocks adjoining thereto, a liner 39 and a magnetic fluid.

The sleeve 11 is inserted into cylindrical liner 39 having a flange at its forward end which is fastened to sleeve 11 by clamp ring 41 using bolt 44, rubber ring 45 and backup ring 42. Thereby a specified part of the inside of the liner 39 bears through the seal rings 42 and 43 against the outside of the sleeve 11, while the outside of the liner 39 is opposed by specified gaps 40 radially inside of the iron pole blocks 34 and 34b and permanent magnets 33, 33a, 33b and 33c.

Relevant dimensions are selected such that when the propeller shaft is loosely fitted in the housing 31, the gaps between the outside surface of sleeve 11 shrink-fitted to propeller shaft 2 and the radially inside surface of the iron pole blocks may be smaller than the gaps 40 between the outside surface of sleeve 11 and the radially inside surface of permanent magnets 33, 33a, 33b and 33c. Gaps 40 are then filled with a magnetic fluid 40' as the sealant.

Magnetic fluid 40' is obtained, as is well-known, by adding various surface-active agents to a base liquid and dispersing magnetite particles of about 100 A therein by a mechanical crushing method or by a chemical reaction, whereby on account of the surface-active agents added thereto the magnetite particles present an absorbent surface with a hydrophobic radical exposed outward, which assures stable dispersion of the particles in the solvent. Such a magnetic fluid is known from the U.S. Pat. No. 3,215,572 (granted Nov. 2, 1965). As is apparent from this patent, such magnetic fluid may be essentially a two-phase mixture of extremely fine (about 100 A) particles of $Fe_3O_4$ and a solvent, but in appearance it exhibits the properties of a ferromagnetic liquid phase. Interaction takes place between particle-to-particle magnetic attraction, London-Vanderwaals dispersive force and the repulsive force of surface-active agents causing thermally supported Brownian movement of the fine particles. A stable colloidal dispersion is thereby attained with no sedimentation due to the gravity, and no cohesion nor separation of particles due to the magnetic field. Accordingly, the fluid can be treated as a homogeneous liquid.

This magnetic fluid has the following features:

(1) A single particle possesses a tremendous magnetic moment;

(2) The whole magnetization curve indicates that magnetization intensifies with magnetic field, but saturation is difficult to create even under high magnetic field; and (3) The magnetization curve exhibits no hysteresis and accordingly no cohesive force develops.

Under this arrangement, as seen from FIG. 6, loops of the lines of magnetic force, 35 and 35', are formed by the permanent magnets 33, 33a, 33b and 33c (the two circular sets thereof collectively identified by the numerals 33' and 33", respectively), the adjoining iron pole blocks 34, 34a and 34b and the line 39. Magnetic fluid 40' in the gaps 40, closes the magnetic circuit along path 35 composed of permanent magnet 33", iron pole block 34, magnetic fluid 40' and liner 39, magnetic fluid 40', iron pole block 34a and permanent magnet 33". A similar magnetic circuit is defined by path 35' which links magnet 33' and blocks 34a and 34b. The magnetic force generated by such closed circuits helps the magnetic fluid 40' maintain its position in the gap 40. When the pole direction of the magnets 33' and 33" is changed, the magnets 33' and 33" will produce a line of magnetic force in pole-one loop, as is well-known and even so, the object of the present invention will be attained.

Also a magnet 36 composed of magnetic material imbedded in an elastic rubber-like material ("a rubber magnet") is installed on the inner projection 38, located at left in FIG. 6, of the housing 31 in such a manner that magnet 36 is separated by a specified radial gap 37 from the opposed outside of the liner 39 and thus a closed circuit along path 52 is constituted as rubber magnet 36, magnetic fluid 40' in gap 37 communicating to the adjacent gap 40, the part of the liner 39 opposed to the rubber magnet 36, magnetic fluid 40', adjacent iron block 34b and rubber magnet 36. In this way the magnetic fluid in gap 37 can also maintain its position and thereby the stern tube-oriented face of the housing provides a seal against invasion of sea water from the direction of the stern tube.

With the magnetic fluid held thus in the gaps 40, and 37, magnetic fluid 40' seals the gaps 40 between the liner 39 and the permanent magnets 33' and 33" and the iron pole blocks 34, 34a and 34b as well as the gap between rubber magnet 36 and the outer face of the liner 39. By this seal there can be no invasion of sea water into the ship's body along the propeller shaft from the direction of the stern tube. A magnetic fluid supply hole 20 serves to compensate for a loss, though slight, of magnetic fluid through mixing with sea water. A clean sea water supply hole 19 serves the same purpose as hole 19 in FIG. 4.

According to the present inventon, a magnetic fluid 40' is held in the gap between the outside of the liner 39 and the permanent magnets 33' and 33" and the iron pole blocks 34, 34a and 34b, magnetic fluid 40' serving as the sealant. Thereby the magnetic stress and a differential pressure working on the magnetic fluid are related as follows:

$$\Delta p = \frac{I_s^2}{4\pi\chi}\left[\exp\{-(\chi/I_s)\cdot H\} + \frac{\chi}{I_s}\cdot H - 1\right]$$

where $\Delta p$ is a differential pressure in dynes/cm$^2$; $I_s$ is the saturating magnetization of magnetic fluid; $H$ is the magnetic field; $\chi$ is magnetic susceptibility; and exp is the natural logarithmic base.

Therefore, if the impressed magnetic field is large enough that $\chi H/I_s$ is large compared to 1, the following approximation will hold:

$$\Delta p = \frac{I_s H}{4\pi}.$$

Accordingly, when a magnetic fluid of large $I_s$ is employed to make H large, a large differential pressure will be withstood with the result that a satisfactory seal can be realized and a high-pressure seal can be attained. Although an ample differential pressure may be secured, the magnetic fluid remains a fluid and the gap 40 remains at least 1-2 mm. Therefore, with only a shear stress of the magnetic fluid developing on the outside of the liner 39 and on the opposed part of the iron pole blocks 34, 34a and 34b and permanent magnets 33' and 33" as the result of rotation of the propeller shaft 2, there can be no possibility of mechanical friction occurring directly between them. Thus, unlike in conventional devices, no abrasion occurs nor is any frictional heat generated. Furthermore, with no mechanical contact at the seal a larger dimensional tolerance of the related members can be set and at the same time, with no friction, there can be no loss in power to drive the propeller shaft. Also, with no abrasion of the sleeve, the sleeve replacement period can be extremely prolonged.

The use of oil materials such as diester, various kinds of oils, paraffin or carbon fluoride (which are highly resistant to sea water), as the base liquid of the magnetic fluid, will cause the magnetic fluid to resist sea water to enhance its lubricating performance.

Figure 9:
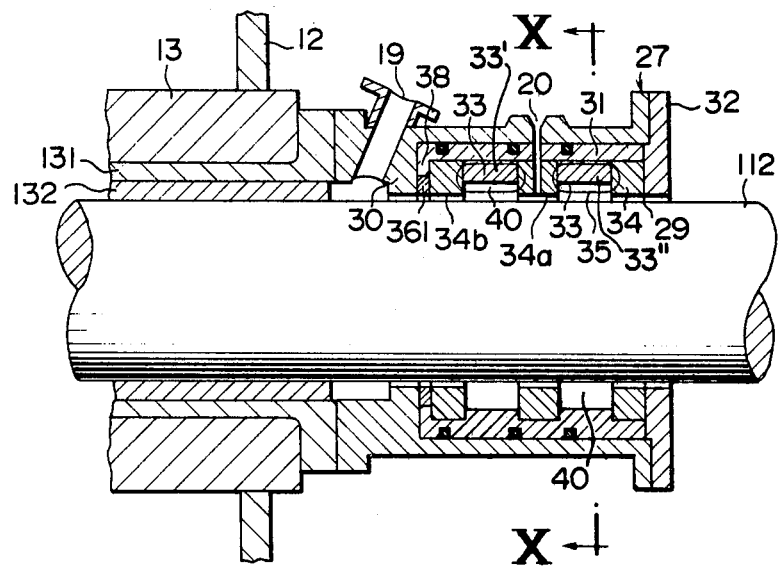
FIG. 9 is a longitudinal sectional view illustrating another embodiment of the present invention.
Figure 10:
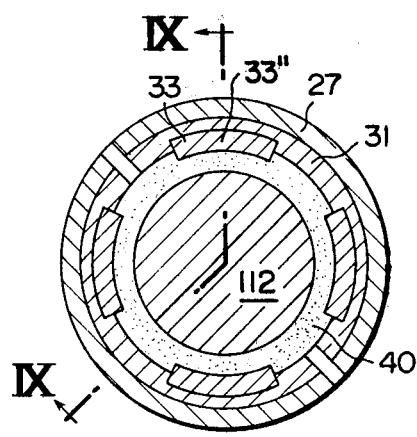
FIG. 10 is a sectional view through section line X—X of FIG. 9.

In the above-mentioned example of a preferred embodiment of the invention, the propeller shaft is shrink-fitted with a sleeve of non-magnetic material such as brass. In this case, a loop of the line of magnetic force must be formed using a liner of magnetic material. Referring to FIGS. 9 and 10 wherein numerals the same numerals as in FIGS. 6 and 7 identify like elements, when the propeller shaft is magnetic and is not covered with a non-magnetic sleeve, as shown in FIGS. 9 and 10, with no use of a liner 39, a magnetic fluid 40' is held in gaps between the inside of the permanent magnets and iron pole blocks in the housing 31 of the same constitution as FIG. 6 and the outside of the propeller shaft 112. As indicated in FIGS. 9 and 10, a loop of the line of magnetic force extends through permanent magnet 33", adjacent iron pole block 34, magnetic fluid 40', propeller shaft 112, magnetic fluid 40', iron pole block 34 and permanent magnet 33". Thus, magnetic fluid serves, just as in the above example, as a seal against invasion of sea water into the ship's body along the propeller shaft.

What we claim is:

1. A device for sealing a propeller shaft extending aftward from a surface of a ship against invasion of water, comprising:
    (1) a cylindrical housing having a longitudinal axis and an inside surface having radial dimensions in excess of the radius of said shaft, concentrically surrounding said shaft, said housing having an aft end facing aftward;
    (2) a plurality of longitudinally spaced annular iron pole blocks having radially outward surfaces, fixed on first concentric circles of said housing to said inside surface and radially inward surfaces spaced from the outer surface of said shaft adjacent said aft end of said housing, said iron pole blocks defining at least one annular space between at least two adjacent ones of said iron pole blocks, having a radially outward portion and a radially inward portion;
    (3) a plurality of circularly arched circumferentially spaced permanent magnets mounted in said radially outward portion of each of said at least one annular space so as to bridge said at least two adjacent ones of said iron pole blocks, leaving a first gap in said radially inward portion and inwardly of said iron pole blocks between the radially inward surfaces of each of said plurality of permanent magnets and said plurality of iron pole blocks on the one hand, and the outer surface of said shaft on the other hand; and
    (4) magnetic fluid comprising magnetic material held in each said first gap; the aftmost one of said at least two adjacent ones of said iron pole blocks forming the aftmost magnetic element of said device in the magnetic circuit inclusive of said magnetic fluid in said each first gap; said magnetic fluid, said permanent magnet, said housing and said iron pole blocks defining a non-contact high-pressure seal.

2. A device as in claim 1, further comprising:
    a sleeve of non-magnetic material covering a portion of said shaft;
    a cylindrical liner of magnetic material covering said sleeve; and
    said plurality of iron pole blocks being radially spaced from said shaft to form said first gap, said magnetic fluid being held in said first gap.

3. A device as in claim 1 wherein said plurality of iron pole blocks comprises at least three iron pole blocks, said iron pole blocks being identically spaced longitudinally.

4. A device as in claim 1 or claim 3 wherein said plurality of permanent magnets comprises at least three identically circumferentially spaced permanent magnets.

5. A device as in claim 2, further comprising an elastic magnetic body installed around the propeller shaft at the aft end of said housing in magnetic contact with the aftmost end of the aftmost one of said plurality of iron pole blocks.

6. A device as in claim 5 wherein said liner has an aft-facing surface and said elastic magnetic body has a surface facing said liner surface, a second gap being formed between said liner surface and said surface of said elastic magnetic body communicating with said first gap, said magnetic fluid filling said first and second gaps.

7. A device as in claim 1 or claim 2, wherein said housing has a magnetic fluid supply hole leading to said first gap.

8. A device as in claim 1 wherein said magnetic fluid comprises magnetite.

9. A device as in claim 1, wherein said first gap completely encircles said shaft and includes the spaces between adjacent ones of said plurality of permanent magnets, the spaces between adjacent ones of said plurality of permanent magnets being bounded radially outwardly by said cylindrical housing, said magnetic fluid filling said first gap.

* * * * *